(12) United States Patent
Hattrup et al.

(10) Patent No.: US 7,353,299 B2
(45) Date of Patent: Apr. 1, 2008

(54) METHOD AND APPARATUS FOR MANAGING AUTONOMOUS THIRD PARTY DATA TRANSFERS

(75) Inventors: Glen Hattrup, Pima, AZ (US); Howard Newton Martin, Pima, AZ (US)

(73) Assignee: International Business Machines Corporation, Armonk, NY (US)

(*) Notice: Subject to any disclaimer, the term of this patent is extended or adjusted under 35 U.S.C. 154(b) by 735 days.

(21) Appl. No.: 10/447,617

(22) Filed: May 29, 2003

(65) Prior Publication Data

US 2004/0243643 A1     Dec. 2, 2004

(51) Int. Cl.
G06F 3/00 (2006.01)
G06F 12/00 (2006.01)
G06F 13/12 (2006.01)
(52) U.S. Cl. .................... 710/30; 710/65; 711/100
(58) Field of Classification Search .............. 710/30
See application file for complete search history.

(56) References Cited

U.S. PATENT DOCUMENTS

| | | | | |
|---|---|---|---|---|
| 5,014,186 A * | 5/1991 | Chisholm | .................. | 710/30 |
| 5,455,926 A | 10/1995 | Keele et al. | .................. | 395/404 |
| 5,740,394 A * | 4/1998 | Minemura et al. | .......... | 710/310 |
| 6,105,122 A | 8/2000 | Muller et al. | .................. | 712/1 |
| 6,148,349 A | 11/2000 | Chow et al. | ................. | 710/33 |
| 6,237,052 B1 | 5/2001 | Stolowitz | ..................... | 710/61 |
| 6,247,077 B1 | 6/2001 | Muller et al. | ................. | 710/74 |
| 6,400,730 B1 | 6/2002 | Latif et al. | .................. | 370/466 |
| 7,058,285 B2 * | 6/2006 | Yokota et al. | ................. | 386/94 |
| 7,062,630 B2 * | 6/2006 | Otake et al. | ................ | 711/171 |
| 2001/0037406 A1 | 11/2001 | Philbrick et al. | ........... | 709/250 |
| 2002/0065924 A1 | 5/2002 | Barrall et al. | ............... | 709/227 |

OTHER PUBLICATIONS

"Dynamic Reformatting and Merging of Data Streams," *IBM Technical Disclosure Bulletin*, vol. 32 No. 9B Feb. 1990, pp. 113-119.

* cited by examiner

*Primary Examiner*—Alan S. Chen
(74) *Attorney, Agent, or Firm*—Kunzler & McKenzie

(57) ABSTRACT

An apparatus, system, and method for managing and formatting data in an autonomous data transfer operation are provided. An initialization module is configured to prepare metadata corresponding to a data source. A loader loads autonomous operation instructions corresponding to the data source into a first location and loads autonomous operation instructions corresponding to the metadata into a second location. An assembler selectively assembles, according to a set of formatting rules, autonomous operation instructions from the first location and the second location into a set of autonomous operation instructions. By assembling an ordered set of autonomous operation instructions, a third party autonomous operation may effectively insert metadata into and remove metadata from a contiguous data stream of a data source without altering the data.

30 Claims, 13 Drawing Sheets

METHOD AND APPARATUS FOR MANAGING AUTONOMOUS THIRD PARTY DATA TRANSFERS

BACKGROUND OF THE INVENTION

1. The Field of the Invention

The invention relates to data backup and recovery. Specifically, the invention relates to apparatus, methods, and systems for managing and formatting data in an autonomous data transfer operation.

2. The Relevant Art

Computer data is frequently stored in secondary, long-term storage devices such as disk drives and tape drives. Such data is often critical to the proper operation of various computer applications. While the data itself may have a very high priority, proper maintenance and preservation of the data through data backup and restore operations typically has a very low priority. Backup and recovery of data is often a lengthy process that requires significant bandwidth and server processing resources.

FIG. 1 illustrates a representative data management system 100 as is frequently used in the prior art for backing up and restoring data. A server 102 is connected to a network 104 and a separate storage area network (SAN) 106. A primary storage device such as a disk drive 108 and a secondary storage device such as a tape drive 110 communicate with the server 102 through the SAN 106.

The SAN 106 is a dedicated network comprising routers (not shown), switches (not shown), and the like that enable high-speed data transfers between devices connected to the SAN 106. Devices connected to the SAN 106, such as the server 102, disk drive 108, and tape drive 110, communicate using high-speed protocols such as Fiber Channel and/or Small Computer System Interface (SCSI). The server 102 may conduct high bandwidth data transfers between the disk drive 108 and the tape drive 110 over the SAN 106, instead of the network 104.

The server 102 may serve as a file server, a print server, a web server, a database server, or the like. It is desirable to minimize the resources such as memory and processor cycles required from the server 102 for conducting a data backup or restore operation. Accordingly, certain conventional data management systems 100 now allow for "server-free" data transfers. The communication protocol for the SAN 106 in such an arrangement includes a data transfer command that allows the server 102 to initiate a data transfer and then return to servicing other processing requests while a third party, another device besides the server 102, executes the data transfer. The third party functions autonomously to conduct the data transfer. Consequently, such operations are also known as autonomous data transfers.

Generally, the data mover 112 is a third party device connected to the SAN 106 that includes a processor and minimal memory. Data movers 112 may comprise routers, bridges, or the like. The data mover 112 is configured to execute a series of data transfer instructions.

The data transfer instructions are low-level instructions that designate a data source, a data destination, and a data size for a data transfer. The instructions are binary commands formatted according to the communication protocol of the SAN 106. Each instruction transfers one or more blocks of data from the source device to the destination device. The data size designates the number of blocks transferred. A data block is the smallest addressable data element that may be transferred between the source device and destination device. Generally, hardware manufacturers and/or the interface protocols for the source and destination devices determine the data block size. Data is transferred in blocks due to potential read/write restrictions of the source device or destination device.

One example of an autonomous data transfer operation is the SCSI third party extended copy command. This command includes a set of data transfer instructions defined within a command descriptor block (CDB). In operation, the server 102 generates and sends an initial CDB over the SAN 106 to the data mover 112. Based on the CDB, the data mover 112 executes an autonomous data transfer between the disk drive 108 and the tape drive 110 to back up data. The data mover 112 is also used to transfer data between the tape drive 110 and the disk drive 108 to restore data.

Such back ups and restorations are conducted on data of various formats. The formats include logical formats such as volumes, files, folders, and the like. Other formats include physical formats such as blocks, sectors, tracks, and the like.

Generally, data management systems are required to back up and restore the data in a manner that leaves the data readily accessible, error free and unaltered once restored. Consequently, metadata is included within the data for identifying and checking data integrity. Conventionally, the metadata comprises data describing characteristics of other data, such as the type, size, error checking information, and any identifying information. Generally, a data management system should remove any metadata added to the user's data so that the restored data is unaltered when presented to a user.

Because the users often desire privacy and security for the data, it is desirable that any backup operations that insert metadata into a user's data stream also remove the metadata and restore the data to its original form. In this manner, the user can be confident that the data is secure and the privacy is preserved.

Unfortunately, due to the complexities involved, limited amounts of metadata are included with the user's data in conventional autonomous data transfers. Typically, the metadata of conventional systems includes only a header and/or end of data marker. No metadata is inserted into the data stream. Consequently, undetectable errors may occur within the data stream.

Certain types of server-free data transfers, such as the SCSI third party extended copy command, place metadata that is pre-generated by the server 102 in a header. Generally, to facilitate backup, recovery, and other data transfers, the physical data blocks of one storage device are sized such that one or more data blocks evenly fit within the blocks of another storage device. For example, generally, the block size on the disk drive 108 and the block size on the tape drive 110 are such that data transferred between the disk drive 108 and the tape drive 110 ends on a block boundary. Including a header with one or more data blocks offsets the data block sizes such that one or more data blocks are split by a block boundary. One may avoid this problem by making the header correspond to the size of one block of the destination device. Doing so, however, wastes space on the destination device. Inserting metadata within a transferred data stream further complicates the problem.

Further unresolved problems lie with the instructions used to formulate the SCSI third party extended copy command. The instructions for the command are rote data transfer instructions to move data from location A to location B. Because the data transfer instructions are such low-level instructions, the instructions must be precisely ordered to properly complete the data transfer. If the instructions are inaccurate, significant time and resources may be wasted.

Neither the data mover 112 nor the autonomous data transfer protocol support logical operations such as generating and inserting metadata within a transferred data stream. Consequently, while it may be desirable to insert metadata within the data stream to allow for more accurate data integrity checks, conventional technology would require the data mover 112 to contact the server 102 for a metadata element defeating the autonomy of the data transfer.

Furthermore, the data mover 112 has a very limited throughput and a low amount of memory for executing an autonomous data transfer. As a result, transferring data objects larger than the capacity of the data mover 112 causes the data mover 112 to fail to complete the operation. In addition, the data capacity may vary between different data movers 112. Conventionally, data movers 112 do not possess the logic required to divide an autonomous data transfer of large data objects into more managable segments.

Accordingly, what is needed is a system and method to overcome the problems and disadvantages of the prior art. In particular, the system and method should be able to insert metadata within and extract metadata from a data stream that is transferred using an autonomous data transfer to allow for more accurate data integrity checking. In addition, the system and method should backup and restore data, including embedded metadata, without altering the original data. Furthermore, the system and method should minimize wasted storage space on the destination storage device. The system and method should divide an autonomous data transfer into segments that are manageable by an available data mover. And, the system and method should allow an autonomous data transfer that includes splitting data blocks and/or segments across block boundaries of the destination storage device.

SUMMARY OF THE INVENTION

The various elements of the present invention have been developed in response to the present state of the art, and in particular, in response to the problems and needs in the art that have not yet been fully solved by currently available systems and methods for managing autonomous operations. Accordingly, the present invention provides an improved apparatus, system, and method for managing and formatting data in an autonomous operation.

In one aspect of the present invention, an apparatus for managing autonomous third party data transfers between a source storage device and a destination storage device includes a determination module. The determination module determines a segment size for an autonomous data transfer. The segment size is based on the data capacity of a data mover that will perform the autonomous data transfer. The segment size is preferably set such that each segment transferred ends on a block boundary of the destination storage device.

The present invention also preferably includes a segmenter configured to divide an autonomous data transfer into segments according to the segment size. An execution module communicates with the segmenter and determination module. The execution module executes and autonomous data transfer for each segment.

The present invention may also include a data block splitter configured to split a source data block into a first fragment and a second fragment. The data block splitter splits the source data block when the source data block extends beyond the block boundary of the destination storage device between a first destination block and a second destination block. The present invention also includes a transfer module that produces data transfer instructions to transfer the first fragment to the first destination block and the second fragment to the second destination block.

In certain aspects, the present invention may include a cache module configured to cache the second fragment when the block boundary corresponds to a segment boundary. In addition, the execution module may transfer a cached second fragment to the second destination block prior to executing an autonomous data transfer for a subsequent segment.

In one embodiment, the present invention includes a segment splitter configured to split a segment into a first segment and a second segment. The segment splitter may, for example, split a segment when the destination storage device issues an end of storage media signal. The segment splitter may also transfer the first segment to the destination storage device and the second segment to a second storage media.

The present invention also includes a method for managing autonomous third party data transfers between a source storage device and a destination storage device. The method includes determining a segment size based on data capacity of a data mover conducting the autonomous data transfer such that each segment ends on a block boundary of the destination storage device. Next, a data object for the autonomous data transfer is divided into segments according to the segment size. Finally, the autonomous data transfer is executed for each segment.

In certain aspects, the method may include producing data transfer instructions to split a source data block into a first fragment and a second fragment, in response to the source data block extending beyond the block boundary of the destination storage device between a first destination block and a second destination block. The method may also include producing data transfer instructions to transfer the first fragment to the first destination block and the second fragment to the second destination block. Furthermore, the second fragment may be cached when the block boundary of the destination storage device corresponds to a segment boundary. The cached second fragment is transferred to the second destination block prior to executing an autonomous data transfer for a subsequent segment.

The various elements and aspects of the present invention provide a novel system and method for formatting a data source and corresponding metadata in an autonomous operation. The present invention in certain embodiments inserts metadata within a data stream transferred using an autonomous data transfer without altering the original data. The present invention minimizes wasted storage space on the destination storage device. Furthermore, the present invention divides an autonomous data transfer into segments that are manageable by an available data mover. The system and method also splits data blocks and/or segments across block boundaries of the destination storage device for autonomous data transfers. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention will be readily understood, a more particular description of the invention, briefly described above, will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
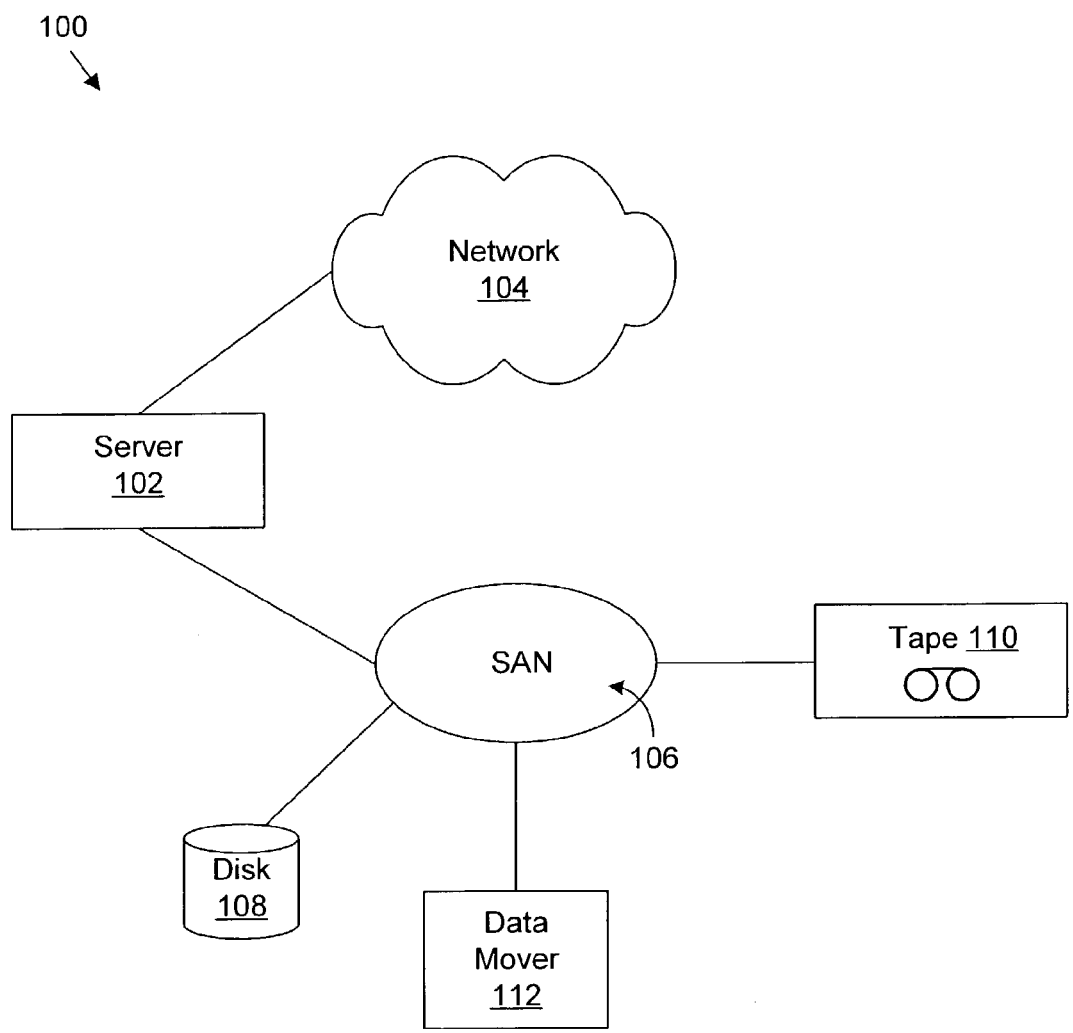
FIG. 1 is a block diagram illustrating a conventional data management environment.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 13, is not intended to limit the scope of the invention, as claimed, but is merely representative of selected embodiments of the invention.

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Certain modules, well known to those of skill in the art, may not be specifically illustrated or discussed, for clarity. Similarly, operational data may be identified and illustrated herein within modules, may be embodied in any suitable form, and may be organized within any suitable type of data structure. The operational data may be collected as a single data set, may be distributed over different locations, including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
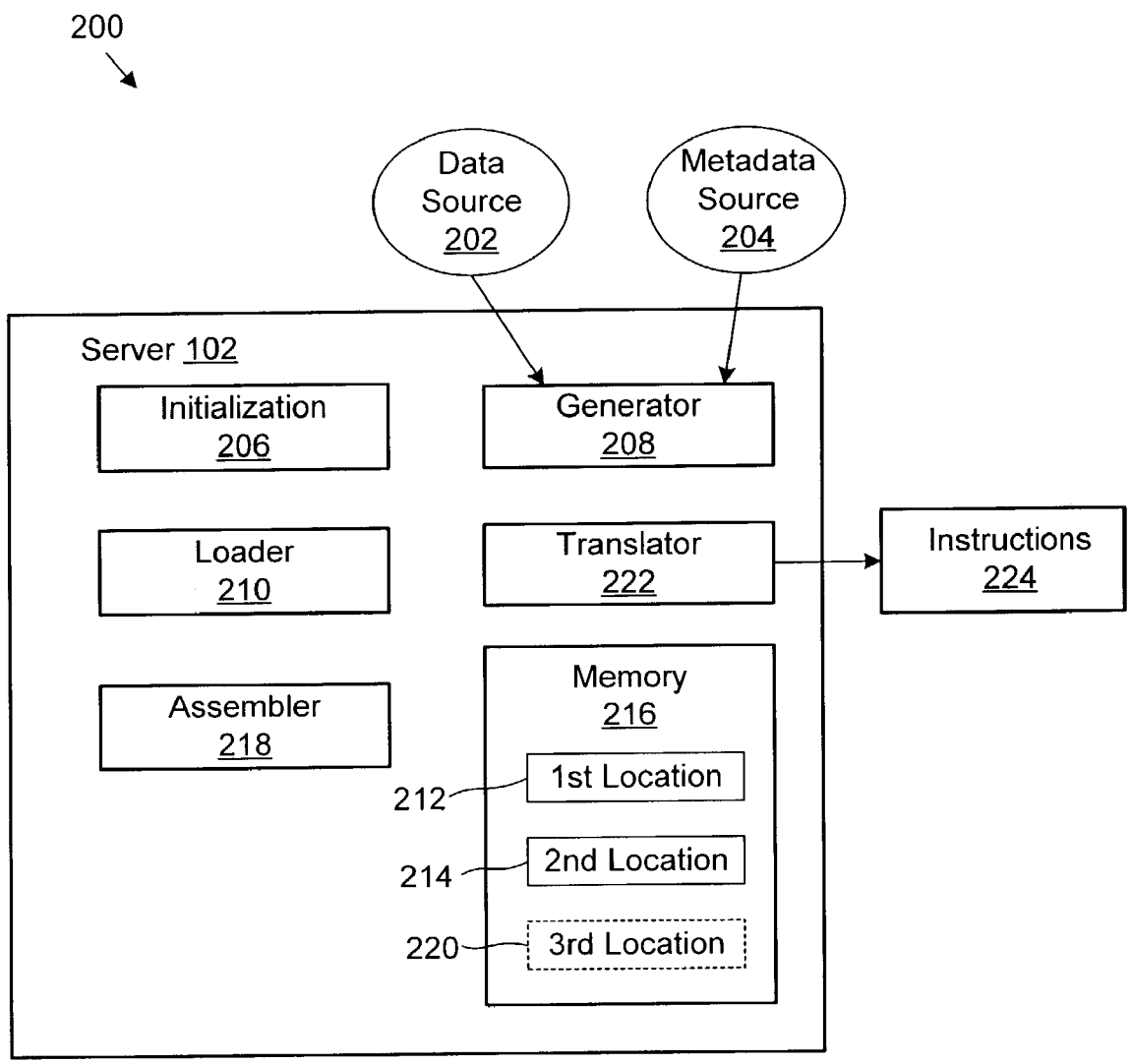
FIG. 2 is a block diagram illustrating one embodiment of the present invention.

FIG. 2 illustrates an apparatus 200 for formatting a data source 202 and corresponding metadata in an autonomous operation. Preferably, the apparatus 200 comprises modules within the server 102. An autonomous operation as defined and used herein is an operation executed by a third party without further input or interaction with a logic unit, controller, processor, server 102, or the like of a data source or target. Preferably, an autonomous operation involves substantially no logic or processing by the third party executing the autonomous operation. Typically, an autonomous operation comprises a set of instructions that are followed in rote fashion. As mentioned above, one example of a third party device configured to execute an autonomous operation is a data mover 112.

A data source 202 as referenced herein is any device or module capable of providing data. Accordingly, a data source 202 may comprise a storage device such as a disk drive 108, a tape drive 110, a memory device, or the like. The data source 202 may comprise removable or fixed media. The data source 202 is configured for random access, meaning that blocks are directly addressable, or for sequential access, meaning that the media must be traversed to locate the data. Alternatively, the data source 202 may comprise a module or function configured to dynamically produce the desired data on demand.

Similarly, the metadata is provided by a metadata source 204. The metadata source 204 may provide metadata from a wide range of media, modules, and the like. Preferably, the metadata source 204 is a storage device. Alternatively, the metadata source 204 may be a module or function that generates the metadata on demand. In a further embodiment, the metadata source 204 may pre-generate metadata.

As mentioned above, one autonomous operation includes data transfers, specifically, data backup and restore operations. While data transfers are discussed herein as specific examples of autonomous operations, those of skill in the art will recognize a variety of other autonomous operations that may be practiced within the scope of the present invention for instance, the autonomous operation may comprise batch processing.

As depicted in FIG. 2, the apparatus 200 includes an initialization module 206. The initialization module 206 prepares metadata that describes or otherwise corresponds to the data of a data source 202. Specifically, the initialization module 206 preferably identifies the metadata source 204 which may be data stored in memory or on a storage medium. Alternatively, the initialization module 206 may determine how to interface with the data source 202 to dynamically generate the metadata as needed. In addition, the initialization module 206 may identify the data on the data source 202. For example, the initialization module 206 may determine location information for data on a disk drive 108 that will serve as the data source 202.

As mentioned above, the metadata preferably describes the data from the data source 202. Preferably, the initialization module 206 prepares metadata that uniquely corresponds to the data of the data source 202. Of course, the initialization module 206 may prepare other data from another data source for use with the present invention. For example, the initialization module 206 may prepare data from a data source for use in striping data in a Redundant Array of Inexpensive Disks (RAID) system.

In one embodiment, the metadata includes a header that identifies the data that follows. The header may include size information, error-checking information, a description for the data, a unique identifier for the data, a timestamp, and the like.

In a preferred embodiment, the metadata also includes markers for insertion at predetermined positions within the set of data included in the autonomous operation. The markers may include by way of example a unique identifier, a timestamp, error checking information such as a Cyclic Redundancy Check (CRC), and the like that are specific to a subset of the data from the data source 202.

In certain embodiments, apparatus 200 includes a generator 208. The generator 208 generates autonomous operation instructions that correspond to the data of the data source 202 and to the metadata of the metadata source 204. Preferably, the autonomous operation instructions are high-level data transfer instructions. For example, one instruction may state "Move A bytes of data from B beginning at address C to D" where A-D are replaced by appropriate address values or devices. Another instruction may state is "Move header metadata from the B to the D."

Preferably, the apparatus 200 also includes a loader 210. The loader 210 may interact with the generator 208. Alternatively, the loader 210 may include functionality for producing the autonomous operation instructions.

The loader 210 loads autonomous operation instructions corresponding to the data of the data source 202 into a first location 212 and autonomous operation instructions corresponding to the metadata of the metadata source 204 into a second location 214. Of course, those of skill in the art will recognize that the loader 210 may load autonomous operation instructions for a data source 202, a metadata source 204, and any number of other data sources into corresponding locations.

The first location 212 and the second location 214 may comprise any storage device, storage module, or storage methodology including leaving the autonomous operation instructions in place and storing pointers to the autonomous operation instructions in memory 216. For example, the first location 212 and the second location 214 may comprise buffers that are stored in actual or virtual memory 216.

Preferably, the first location 212 and the second location 214 hold a plurality of autonomous operation instructions. In certain embodiments, the first location 212 and the second location 214 are structured such that the first autonomous operation instruction placed in the first or second location 212, 214 will be the first one retrieved under a First-In-First-Out (FIFO) scheme.

The apparatus 200 includes an assembler 218 configured to selectively assemble autonomous operation instructions from the first location 212 and the second location 214 in a manner determined by a set of formatting rules. The assembler 218 may move the autonomous operation instructions from the first location 212 or the second location 214 to a third location 220. Preferably, the third location 220 is a buffer in memory 216 that is structured in a manner similar to the first location 212 and the second location 214. For example, the third location 220 may also utilize the FIFO scheme. Alternatively, the assembler 218 may send the selected autonomous operation instructions directly to a third party data mover 112 or another ordered data structure.

The formatting rules determine how autonomous operation instructions are organized within the third location 220. The formatting rules direct the assembler 218 to select either autonomous operation instructions for data in the first location 212 or autonomous operation instructions for metadata in the second location 214. The formatting rules are preferably pre-defined and formulated to result in a specific format for the data and metadata following the autonomous operation.

In certain embodiments, the apparatus 200 may include a translator 222. Preferably, the autonomous operation instructions are in a high-level format, as mentioned above. The translator 222 processes and converts the autonomous operation instructions into low-level instructions 224, much like a compiler converts human-readable programming code into machine-readable code. For every autonomous operation instruction, the translator 222 may produce one or more low-level instructions 224. The translator 222 formats the low-level instructions 224 for execution by a third party such as a data mover 112.

In certain embodiments, the translator 222 organizes the low-level instructions 224 into a parameter set. The parameter set is a set of instructions for a particular function. For example, in the preferred embodiment, the translator 222 groups the low-level instructions 224 into a CDB (Command Descriptor Block) suitable for execution by a third party data mover 112 that receives a third party extended copy command and the CDB.

The apparatus 200 of FIG. 2 in one embodiment formats data and metadata in an autonomous operation. The size of the data and metadata, however, may affect the ability of the physical devices, the data mover 112, disk drive 108, SAN 106, and tape drive 110 to complete the autonomous operation. For example, low-level instructions 224 to transfer a data such as a data object from the disk drive 108 to the tape 110 may be too large to fit within the limited memory of the data mover 112. If the data mover 112 is required to fetch the low-level instructions 224 from the server 102, the autonomy of the operation is frustrated.

Figure 3A:
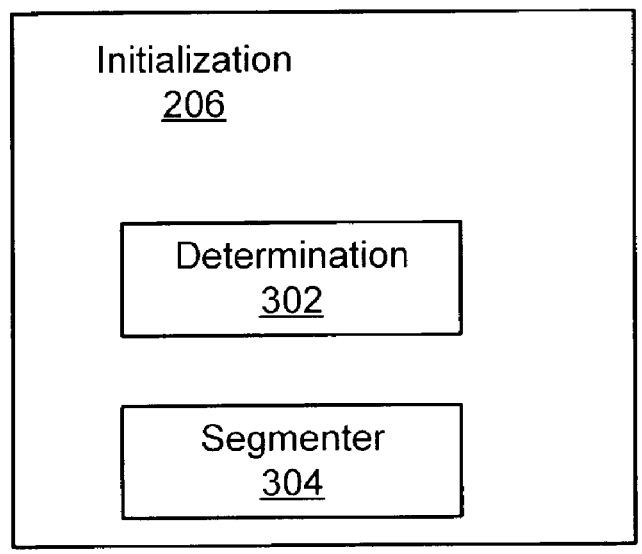
FIG. 3A is a block diagram illustrating one embodiment of an initialization module of the present invention.

Accordingly, as illustrated in the FIG. 3A, the apparatus 200 is configured in one embodiment to manage an autonomous third party data transfer by dividing the data object for transfer into smaller segments. Specifically, the initialization module 206 preferably includes a determination module 302 and a segmenter 304.

The determination module 302 determines an appropriate segment size for an autonomous data transfer. At least two factors influence the segment size. One factor is the data capacity of a data mover 112 that will conduct the autonomous data transfer. Preferably, the initialization module 206 identifies the data capacity of a data mover 112, connected to the SAN 106, that is required to perform the autonomous data transfer. The data capacity includes limitations of the data mover 112 such as throughput, buffer sizes, memory or cache sizes, and the like.

The second factor influencing segment size is ensuring that each segment transferred ends on a block boundary of the destination storage device such as a tape drive 110. As mentioned above, different storage media often have different size blocks. For example, a disk drive 108 may have disk blocks that are four Kbytes in size and a tape drive 110 may have tape blocks that are sixty-four Kbytes in size. As mentioned above, although block size may differ between storage media, one block size is typically factorable by the other block size. In this example, four disk blocks fit evenly within one tape block. Consequently, the segment size can be, and preferably is, set such that transferred segments end on a block boundary of the destination storage device.

The determination module 302 uses the data capacity of the data mover 112 and any differences in block sizes to calculate a segment size. In one embodiment, the determination module 302 selects the largest block size of a source storage device and a destination storage device. That block size is selected to be the operable block size. Next, a floor-type formula is used to determine a suitable segment size. The floor-type formula calculates a minimal operable segment size.

In one embodiment, the determination module 302 divides the data capacity of the data mover 112 by the operable block size. The whole number portion of the result represents the maximum number of blocks the data mover 112 can handle. Any fraction amount is discarded. The determination module 302 multiplies the maximum number of blocks the data mover 112 can handle by the operable block size to determine a suitable size for the segments.

For example, suppose the operable block size is 32 Kbytes and the data capacity of the data mover 112 is 115 Kbytes. 115/32=3.59. Discarding the remainder, the maximum number of blocks is multiplied by the operable block size, i.e., 3*32=96. Consequently, the segment size based on this example is 96 Kbytes.

In addition to determining a suitable segment size, the determination module 302 also preferably determines the total size for the data object including the metadata. The size of the data object is known. The size of the metadata is also known or calculable. While different types of metadata may be used, the size of the data object allows the determination module 302 to calculate the amount of metadata required.

The initialization module 206 may also include a segmenter 304 that divides the data transfer into manageable segments that will not cause the data mover 112 to fail to complete the operation due to hardware data capacity constraints such as hardware buffer or memory sizes. The segmenter 304 divides the autonomous data transfer into segments based on the segment size.

Preferably, the overall size of the data transfer, including metadata, is divided by the determined segment size. In the example above, suppose the overall data transfer size is 982 Kbytes and the segment size is 96 Kbytes. Rounding up, the data transfer is divided into 11 segments (982/96=10.23). Rounding up ensures that all of the data and metadata will fit in the segments. In addition, each segment will end on a block boundary of the destination device due to the manner for calculating the segment size.

Figure 3B:
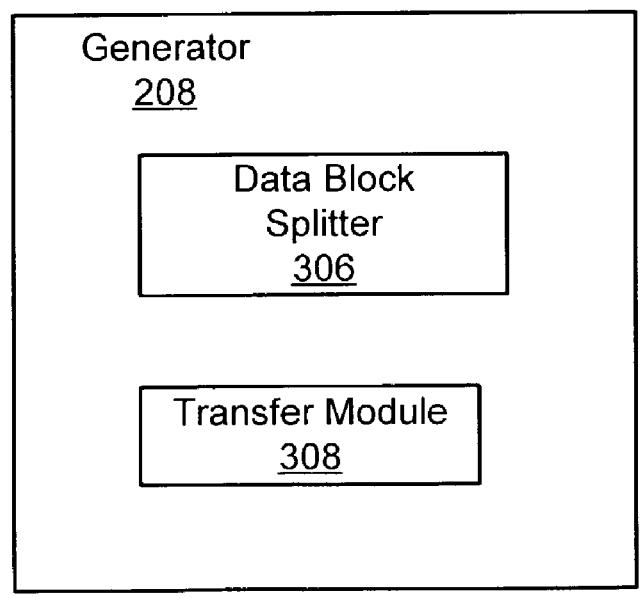
FIG. 3B is a block diagram illustrating one embodiment of a generator module of the present invention.

FIG. 3B illustrates a generator 208 according to one embodiment of the present invention. The depicted generator 208 includes a data block splitter 306 and a transfer module 308. The generator 208 communicates with the initialization module 206 such that the generator 208 has access to the source block size, the destination block size, and the segment size.

Preferably, to ensure that hardware limitations do not prevent effective autonomous operations such as data transfers, the server 102 issues an autonomous data transfer command for one segment at a time. Once a segment is successfully transferred, a subsequent segment autonomous data transfer command is issued. Of course, the server 102 may prepare the autonomous data transfer commands in a batch mode or as needed. Typically, the last segment will be less than full.

As mentioned above, the generator 208 may generate autonomous data transfer instructions for the data and metadata. Preferably, the system 200 always inserts the metadata at the start of a new destination block. Consequently, the metadata offsets the data block such that a data block may extend past the end of a block boundary for a destination storage device such as a tape drive 110. Furthermore, because the segment size is set, certain data blocks may extend beyond a destination storage device block boundary that is also a segment boundary.

The data block splitter 306 determines when a source data block extends beyond a block boundary between a first destination block and a second destination block for the destination storage device. In addition, the data block splitter 306 splits the source data block into a first fragment and a second fragment.

The transfer module 308 produces a data transfer instruction to transfer the first fragment to a first destination block and the second fragment to a second destination block. Typically, the third party such as a data mover 112 comprises sufficient logic to handle an instruction for a split block. Alternatively, the transfer module 308 may produce a separate data transfer instruction for the first fragment and the second fragment.

Figure 4:
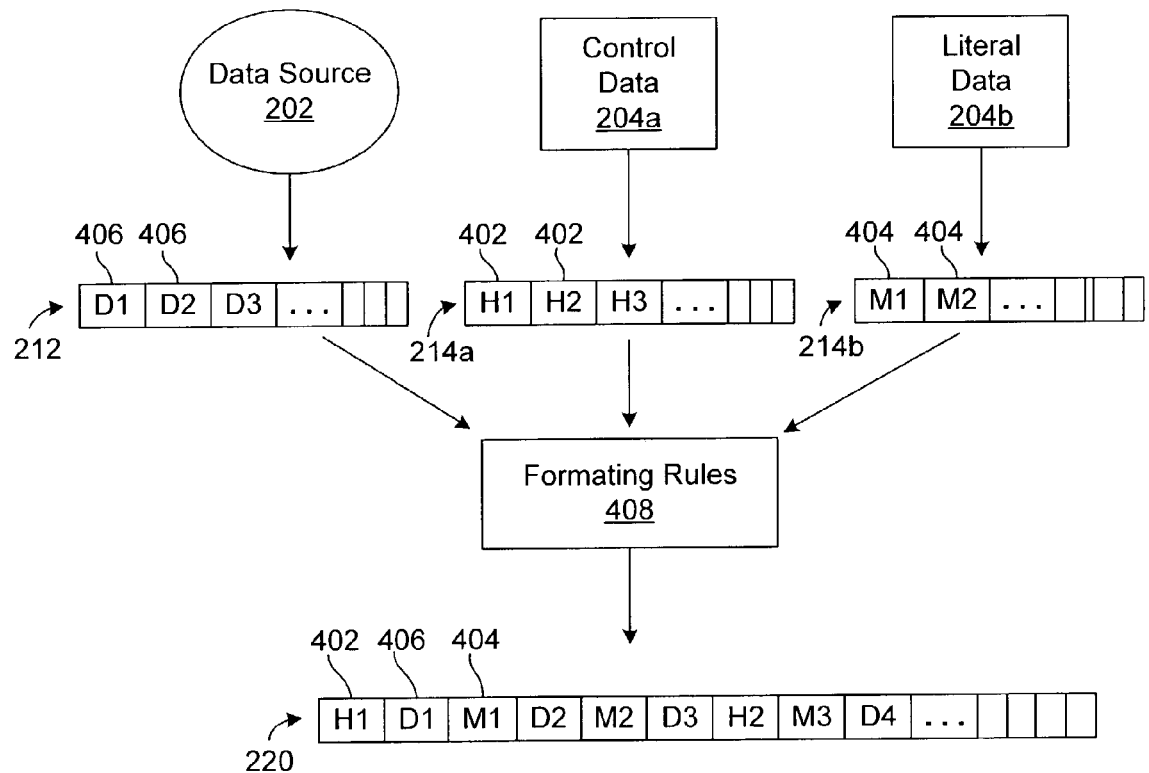
FIG. 4 is a block diagram illustrating formatting of data and metadata according to one embodiment of the present invention.

FIG. 4 illustrates the formatting of data and metadata according to one embodiment of the present invention. In the depicted embodiment, it is desirable to format the data in the data source 202 with two different types of metadata 204, control data 204a and literal data 204b. Of course, the present invention allows for any number of data sources 202 and/or metadata 204. The present invention prepares autonomous operation instructions. The instructions preferably include, or reference, the data (raw data or metadata) that will be involved in the particular autonomous operation. The terms "data block instructions" and "data blocks" and "metadata instructions" and "metadata" may be referred to interchangeably herein for clarity. However, those of skill in the art will recognize, from the context, when the actual data is intended and when an instruction relating to the data is intended. FIG. 4 illustrates a process for organizing instructions such that the data actually transferred by the autonomous operation contains the desired format. Preferably, the autonomous operation is a SCSI third party extended copy command.

In one configuration, the control data 204a may comprise a header that describes portions of the overall data transfer. For example, the control data 204a may include information such as a label, a timestamp, CRC values, the number of markers that will be embedded within the data from the data source 202 once the transfer is complete, and the like. The header is preferably included, or referenced, by a header instruction 402 (H1, H2, . . . Hn).

The literal data 204b may comprise markers for use in checking data integrity for sub-parts of the transferred data. The marker may include information such as a marker identifier, a timestamp, the offset from the beginning of the data transferred to the marker, and the like. A marker provides an indicator of how much data, including metadata, has been transferred. Validating the markers provides from more robust data verification. The marker is preferably included, or referenced, by a marker instruction 404 (M1, M2, . . . Mn).

As mentioned above, the data is divided into data blocks. The data blocks include, or referenced, by data block instructions 406 (D1, D2, . . . Dn). The present invention preferably manipulates the header instructions 402, marker instructions 404, and data block instructions 406 such that the actual data transferred is in the desired format.

As mentioned above, the apparatus 200 moves the data block instructions 406 into a first location 212 and the metadata instructions 402, 404 into a second location 214a, 214b. Preferably, the first location 212 and the second location 214a, 214b are locations to store lists of abstract copy orders that reference virtual first-in-first-out (FIFO) buffers. A virtual FIFO buffer is a description of a temporary storage location for data that is not associated with a real storage location. An abstract copy order is a form of autonomous data transfer instruction in which either the data source or data destination can be a virtual FIFO buffer instead of a definite storage location.

Abstract copy orders and virtual FIFO buffers are used in a method, system, and apparatus that manages autonomous data transfer instructions in which either the data source, or data destination, is unknown prior to execution of the instruction. The virtual FIFO buffer functions without using temporary storage. This method, system and apparatus Virtual FIFO buffers are explained in greater detail in commonly owned U.S. patent application Ser. No. 10/383,951 with inventors David Chambliss and Jo Lay, filed on Mar. 7, 2003, which is incorporated herein by reference.

As mentioned above, an assembler 218 preferably assembles the data block instructions 406 and the metadata instructions 402, 404 into a third location 220 based on formatting rules 408. A particular module or application that intends to format the data with metadata defines the formatting rules 408. In one embodiment, the application is a Tivoli Storage Manager (TSM) system available from IBM Corp., of Armonk, N.Y.

The formatting rules 408 define the order for pulling data block instructions 406 and the metadata instructions 402, 404 from the first location 212 and the second location 214a, 214b. In the depicted embodiment, the formatting rules 408 indicate that a header instruction 402 (H1) is to be inserted, followed by three data block instructions 406 (D1, D2, D3) that are separated by marker instructions 404 (M1 and M2). This procedure is repeated until all the data in the first location 212 is processed. Preferably, the number of header instructions 402 and marker instructions 404 correspond to the number of data block instructions 406 such that the second location 214a, 214b empties when the first location 212 does.

Figure 5:
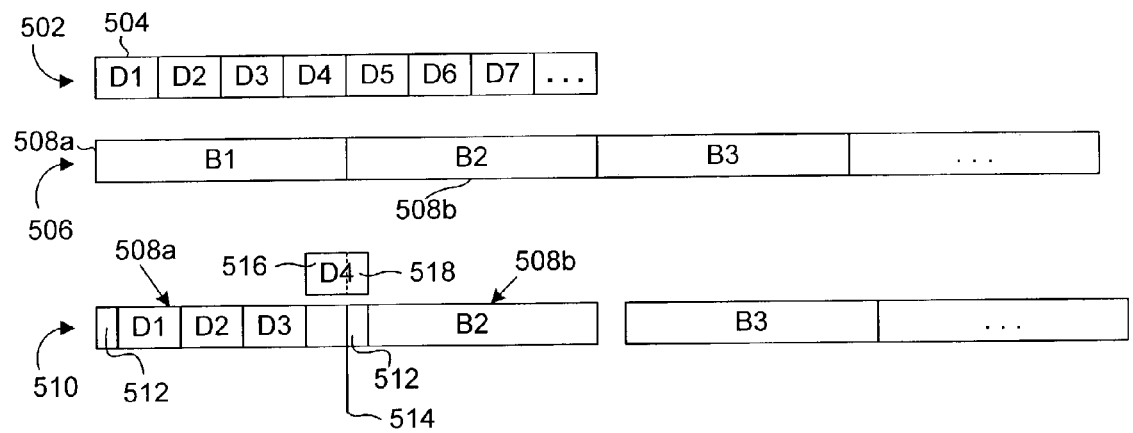
FIG. 5 is a block diagram illustrating splitting of data blocks that extend across block boundaries according to one embodiment of the present invention.

FIG. 5 illustrates how fixed destination block sizes require splitting of data blocks offset by inserted metadata. For clarity, FIG. 5 illustrates relative sizes of different data structures, but, is not drawn to scale. The relative sizes illustrate the requirement for splitting of data blocks.

The apparatus of FIG. 2 is configured to manage split data blocks. List 502 illustrates a set of ordered source data blocks 504 (D1-Dn) for a data object. List 506 illustrates a set of ordered destination blocks 508 (B1-Bn) of a destination storage device such as a tape drive 110. Specifically, a first destination block 508a and a second destination block 508b are illustrated. List 510 illustrates one example of how the source data blocks 504, including metadata 512, may fit within the destination blocks 508.

Preferably, metadata 512 is of a fixed size. Alternatively, the metadata 512 may be of various sizes. For example, the control data 204a and literal data 204b (See FIG. 4) may be of different sizes.

In one embodiment, a formatting rule 408 may require insertion of the metadata 512 first into the destination block 508. FIG. 5 illustrates that the destination block 508 is sized to hold approximately four source data blocks 504. Inserting metadata 512, however, shifts the source data blocks 504 such that only three source data blocks 504 fit evenly in the destination block 508. The fourth source data block 504 (D4) extends beyond the block boundary 514 for the first destination block 508a.

The block boundary 514 divides the fourth source data block 504 (D4) into a first fragment 516 and a second fragment 518. The data block splitter 306 and transfer module 308 (See FIG. 3B) cooperate to provide autonomous transfer instructions such that the first fragment 516 is transferred to the first destination block 508a and the second fragment 518 is transferred to the second destination block 508b.

Differences between storage devices may require special handling of data blocks 504 that extend past a block boundary. Specifically, certain storage devices such as disks 108 permit reading of variable length disk blocks, but not writing of variable length disk blocks. In contrast, a tape drive 110 typically allows both reading and writing of whole and variable length tape blocks. Consequently, the data block splitter 306 and transfer module 308 properly handle split source data blocks 504 such that autonomous data transfers accommodate a more restrictive storage device such as a disk drive 108.

Figure 6:
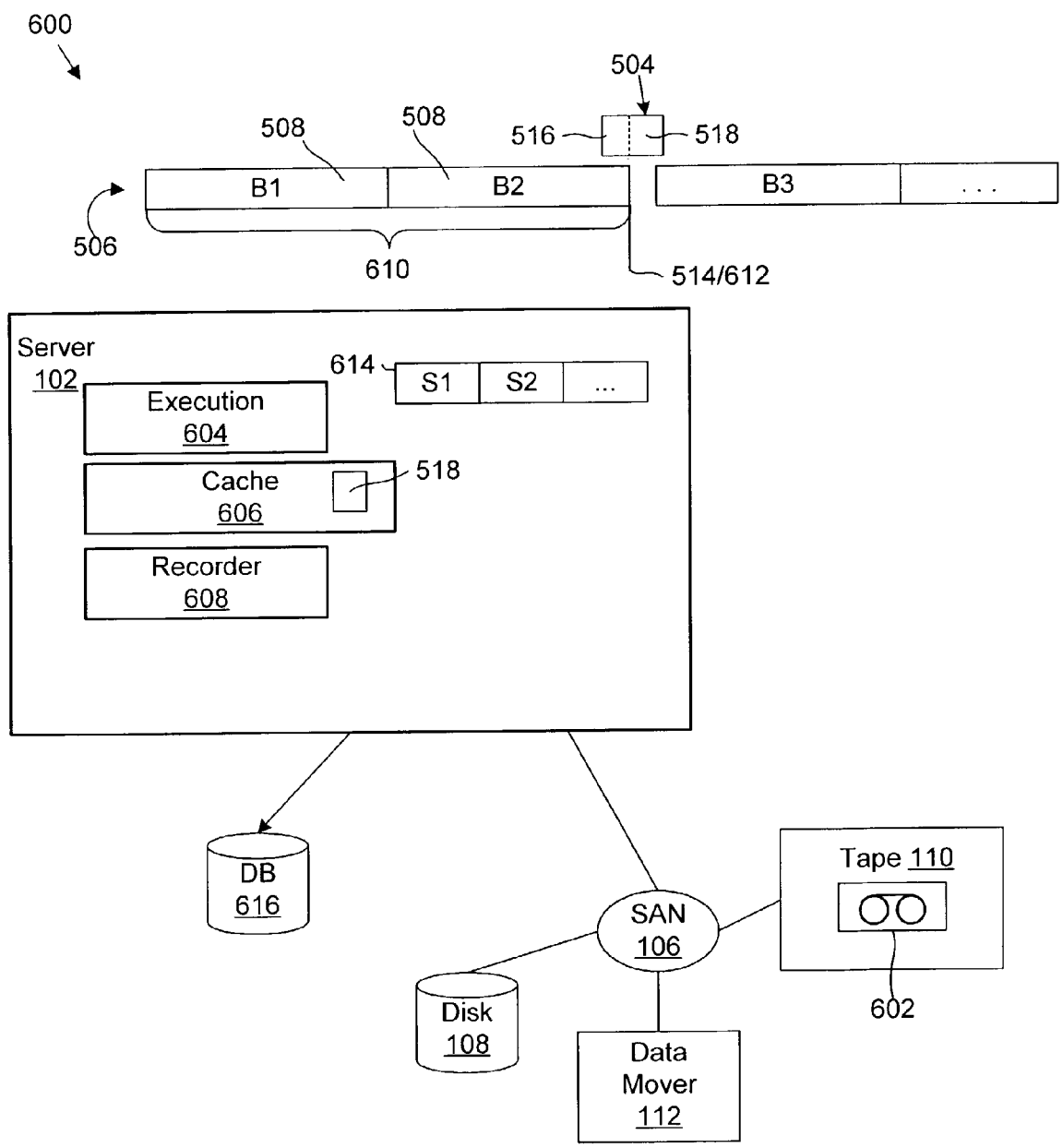
FIG. 6 is a block diagram illustrating splitting of data blocks that extend across segment boundaries according to one embodiment of the present invention.

FIG. 6 illustrates an alternative system 600 for managing autonomous third party transfers between a source storage device and a destination storage device. For example, a server 102 may prepare a set of instructions for a SCSI third-party extended copy command to transfer data from a random access media device such as a disk drive 108 to a removable sequential access media such as a tape 602 of a tape drive 110.

In addition to the components and modules discussed above, the server 102 also includes an execution module 604, a cache module 606, and a recorder 608. As mentioned above, the limitations of hardware devices such as a data mover 112, a disk drive 108, and/or a tape drive 110 may require dividing a data object into segments 610. The execution module 604 executes an autonomous data transfer for each segment 610.

List 506 illustrates how the size of the segment 610 compares to the destination blocks 508. As discussed above, the segment size is preferably determined such that the segment 610 always ends on a block boundary 514 for the destination device. As described in relation to FIG. 5, a disk block 504 may extend beyond the block boundary 514. As illustrated in FIG. 6, certain block boundaries may coincide with a segment boundary 612.

In a preferred embodiment, each autonomous data transfer operation involves a single segment 610 due in part to the hardware constraints of the data mover 112. Consequently, for a split data block 504, the data mover 112 may store the first fragment 516, however, the second fragment 518 is not stored in the same segment 610 and cannot be included in the same autonomous data transfer operation. The cache module 606 caches the second fragment 518 when the block boundary 514 corresponds to a segment boundary 612.

Furthermore, the execution module 604 transfers the cached second fragment to a second destination block 508 prior to executing an autonomous data transfer for a subsequent segment 610. For example, prior to beginning an autonomous data transfer for a subsequent segment 610, the execution module 604 may check to determine if a cached fragment 518 exists. If so, the execution module 604 may transfer the cached fragment 518 before the subsequent segment 610.

The server 102 or any other suitable processor may prepare the segments 610 (S1, S2, . . . Sn) dynamically in response to successful transfer of previous segments 610. Alternatively, the server 102 prepares a batch of segments 610 that are stored in a queue 614. The execution module 604 may process segments 610 sequentially from the queue 614 until an entire data object, including the inserted metadata 512, is transferred to the destination storage device.

In certain embodiments, the server 102 includes a recorder 608 that communicates with a database 616 to log information for one or more segments transferred to the destination device. For example, the recorder 608 may log the number of segments transferred and the number of destination blocks 508 comprising the segment 610. Of course, other information may also be logged.

Figure 7:
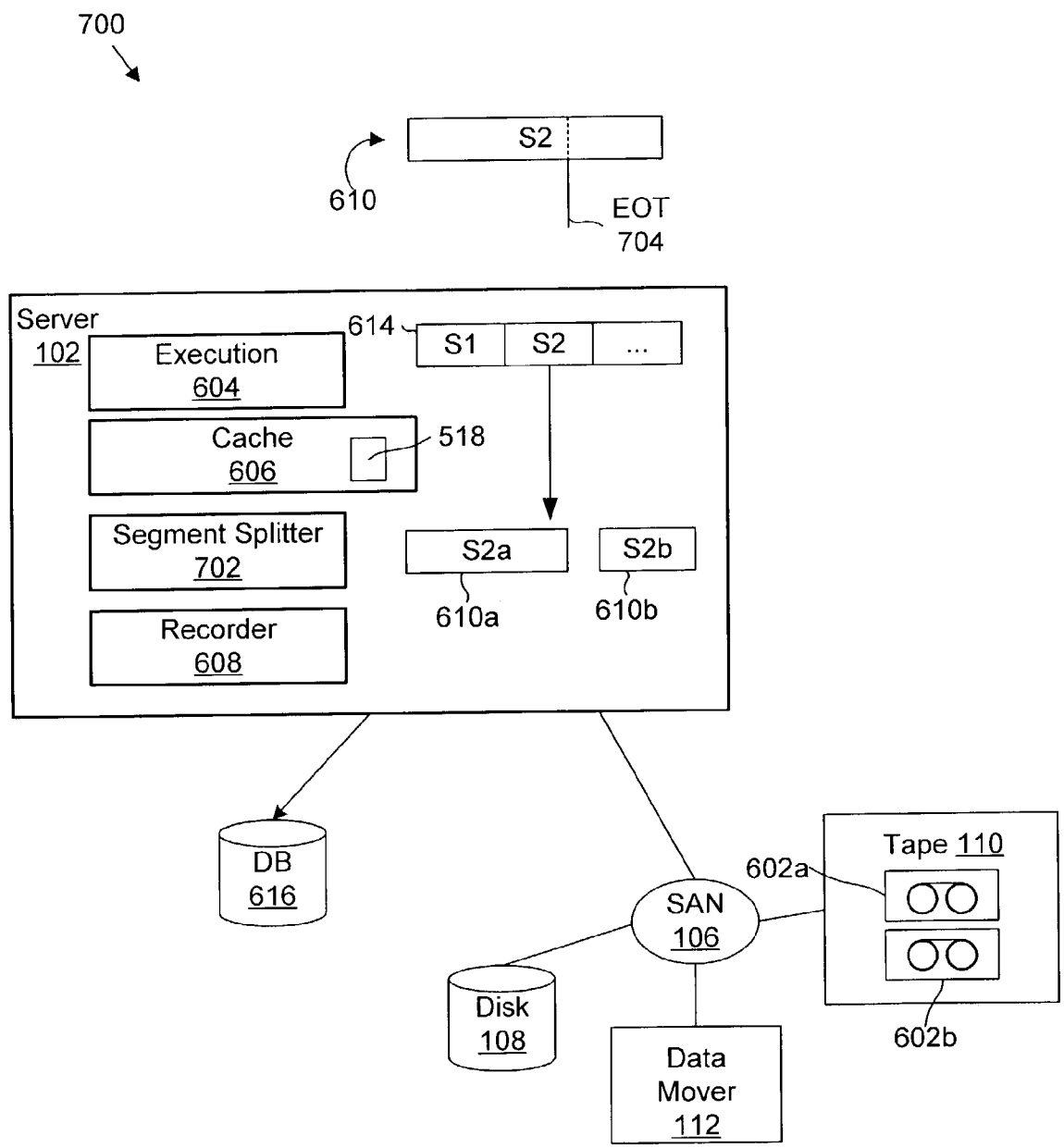
FIG. 7 is a block diagram illustrating management of autonomous data transfers when the end of the destination storage media is reached according to one embodiment of the present invention.

In certain circumstances, a hardware device such as the destination storage device may interrupt autonomous data transfers by sending a signal. For example, FIG. 7 illustrates a system 700 that conducts autonomous data transfers for segments 610 according to one embodiment of the present invention.

If the destination storage device is a tape drive 110, the tape drive 110 may send a signal to the server 102 interrupting an autonomous data transfer due to the end of a tape 602a receiving the data. To accommodate such a condition, the server 102 may include a segment splitter 702.

The segment splitter 702 in one embodiment is configured to respond to a signal from the destination storage device has reach the end of the tape 704 (EOT). The segment splitter 702 divides the interrupted segment 610 into two segments.

Often, the tape drive 110 successfully writes out full tape blocks up to the EOT 704. Consequently, the first part of the split segment does not need to be re-transferred. Accordingly, suppose an EOT signal 704 interrupts the segment S2. The segment splitter 702 divides the segment S2 into a first segment S2a and a second segment S2b. Next, the segment splitter 702 may signal the tape drive 110 to load a second tape 602b. The execution module 604 then transfers the second segment S2b to the second tape 602b. Accordingly, the recorder 608 may record transfer of two segments 610 instead of just one.

Figure 8:
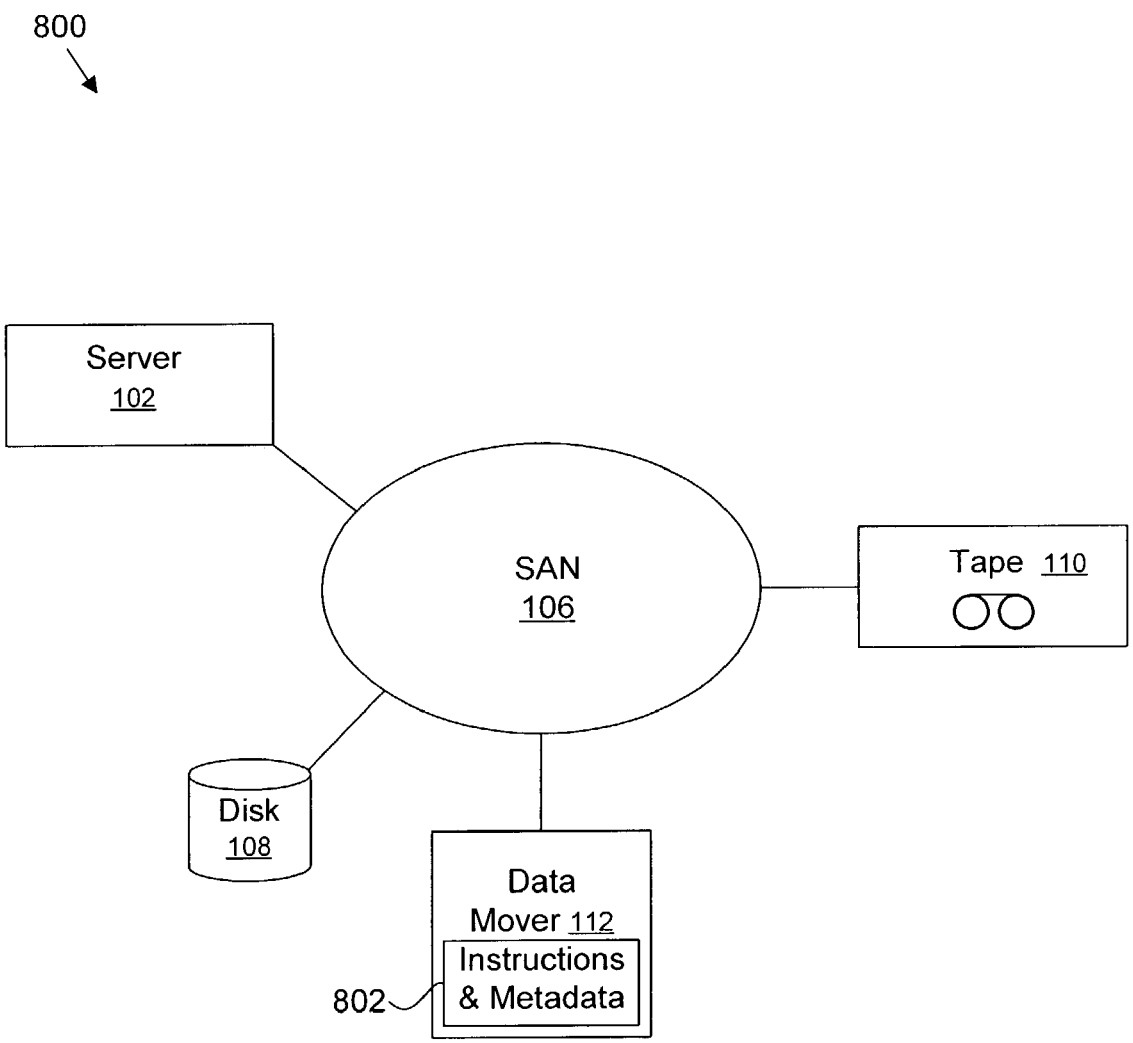
FIG. 8 is a block diagram of a system according to one embodiment of the present invention.

FIG. 8 illustrates a system 800 configured to format a data source and corresponding metadata for an autonomous operation. Preferably, each autonomous operation corresponds to a data transfer for a segment of a data object stored in the data source 202 such as a disk drive 108. If the size of the data object is less than the physical limitations for the data capacity of the data mover 112, the system 800 transfers the data object in a single autonomous operation. Otherwise, system 800 divides the data object into segments 610 that are transferred one at a time.

The system 800 allows a third party device such as the data mover 112 to conduct the autonomous operation with minimal involvement of the server 102. The data transfer preferably takes place between a source device such as a disk drive 108 and a destination device such as a tape drive 110. Alternatively, the data transfer may occur between volumes of a single disk drive 108, or other storage media. Typically, the data mover 112 issues I/O (Input/Output) instructions to the data mover 112 to accomplish the data transfer.

The server 102 prepares a set of autonomous operation instructions 802. The instructions 802 may include copy commands for data as well as metadata. For example, the commands may comprise suitable commands for a SCSI third party extended copy command. Of course the source device 108 and destination device 110 are also preferably configured to respond to third party extended copy commands issued by the data mover 112 over a network, the SAN 106. The commands are organized and associated with segments 610 as appropriate by embodiments such as those described in relation to FIGS. 2-3B. Preferably, the data mover 112 reports a result for an autonomous operation such as a third party extended copy command to the server 102 or other processor that issued the command to the data mover 112.

The system 800 allows an application (not shown) executing on the server 102 to initiate an autonomous data transfer for very large data objects without dealing with the complexities of producing the machine-code level instructions required for the data mover 112 to conduct the data transfer. Furthermore, the system 800 allows formatting of the data without manipulating the data. The system 800 also deformats and restores the data from the destination to the source as needed using the same modules and processes.

Figure 9:
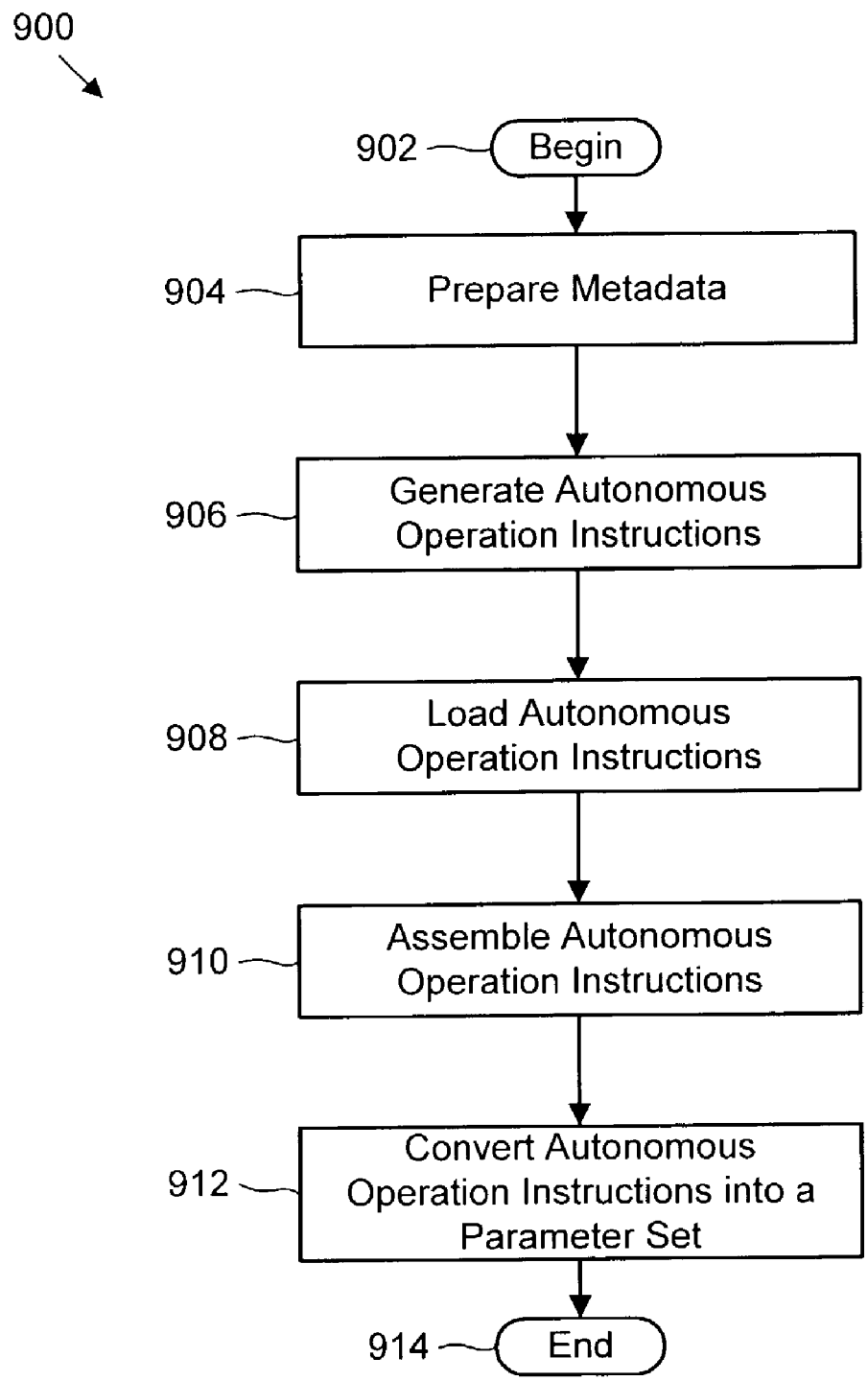
FIG. 9 is a flow chart illustrating a method for formatting a data source and corresponding metadata in an autonomous operation according to one embodiment of the present invention.

Referring to FIG. 9, a method 900 for formatting a data source and corresponding metadata in an autonomous operation is illustrated. The method 900 begins 902 when a user or module initiates an autonomous operation. For example, a scheduler of a server 102 may determine that a backup of data on a disk drive 108 is required. A user may initiate the autonomous operation. Alternatively, a system function may automatically initiate the autonomous operation.

First, metadata 512 corresponding to a data source is prepared 904 for the autonomous operation. As discussed above, preparation of metadata may include locating and/or generating metadata that properly describes the data that is involved in the autonomous operation. Preferably, the autonomous operation is a data transfer.

Next, a generator 208 may optionally generate 906 autonomous operation instructions for the autonomous operation. As discussed above, the autonomous operation instructions may include raw data or references to data stored at a specific location.

A loader 210 may load 908 autonomous operation instructions for the data into a first location and autonomous operation instructions for metadata into a second location. Preferably, the first location and second location are FIFO virtual buffers. Alternatively, another FIFO structure temporary storage structure may be used.

The autonomous operation instructions are then assembled 910 according to formatting rules. The formatting rules are pre-defined. Preferably, the autonomous operation instructions relate directly to copy commands for data or metadata. Consequently, the order of the autonomous operation instructions determines the order of the data on the destination storage device. The data mover 112 typically processes the autonomous operation instructions sequentially.

In certain aspects, the method 900 may also include converting 912 autonomous operation instructions into a parameter set. For example, a translator 222 may convert 912 high-level human-readable instructions into low-level machine-readable instructions for a data mover 112. For example, the translator 22 may compose a CDB for a SCSI third party extended copy command.

Once all the autonomous operation instructions are assembled in an order that will format the data and metadata as desired, the method ends 914. The method 500 of the present invention allows assembly of the autonomous operation instructions without altering data of the data source. The method may allow adding of metadata within the data stream such that more robust error and validity checking of the data is possible.

Figure 10:
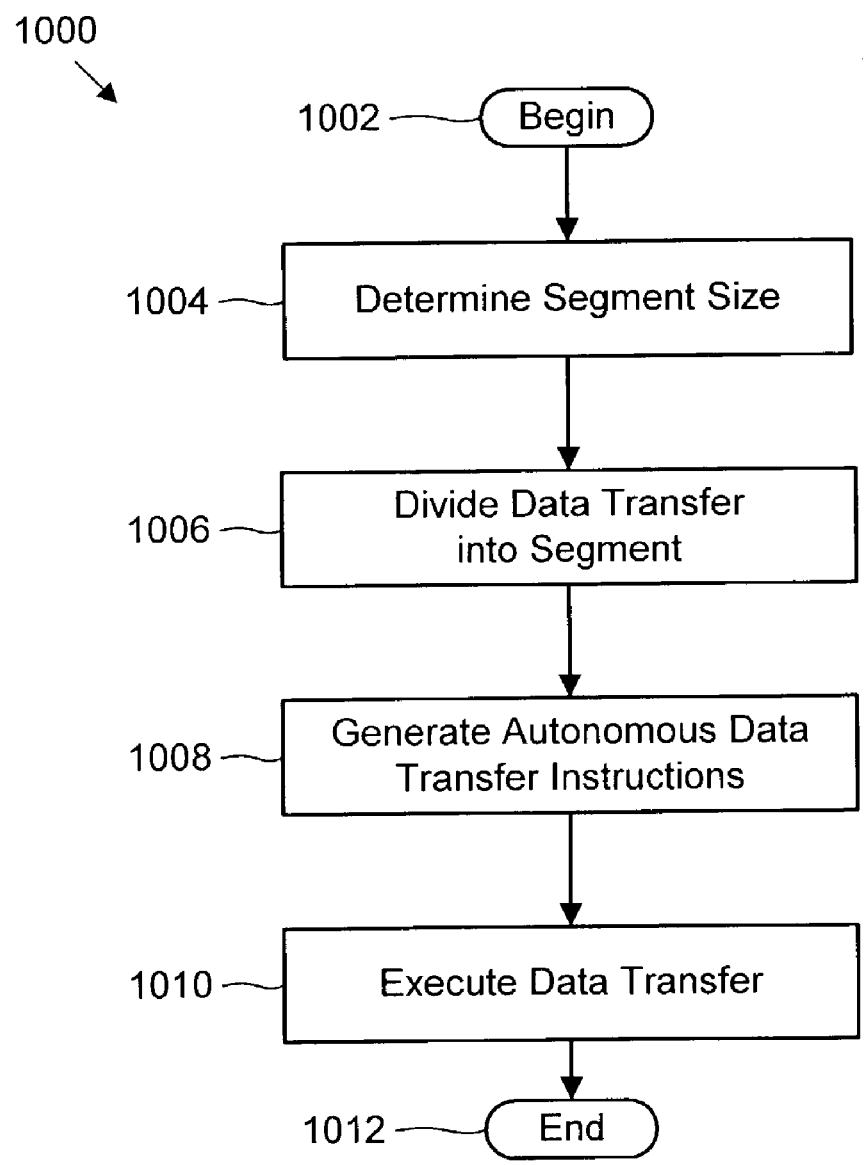
FIG. 10 is a flow chart illustrating a method for managing autonomous third party transfers between a source storage device and a destination storage device according to one embodiment of the present invention.

FIG. 10 illustrates a method 1000 for managing an autonomous third party data transfer between a source storage device and a destination storage device. The method 1000 begins 1002 once a determination is made that the data object of the source storage device is too large for capabilities of the third party hardware that will carry out the data transfer.

First, a segment size is determined 1004 for the data transfer. The segment size is determined based on the data capacity of the third party device such as a data mover 112. Preferably, the segment size is set such that each segment ends on a block boundary of the destination storage device.

Next, the autonomous data transfer is divided 1006 into segments 610 according to the segment size. Preferably, autonomous data transfer instructions are generated 1008 for each segment 610. Alternatively, the autonomous data transfer instructions are pre-generated. Finally, an autonomous data transfer is executed for each segment 610. Once an autonomous data transfer is executed for all the segments 610, the method 1000 ends 1012.

Figure 11:
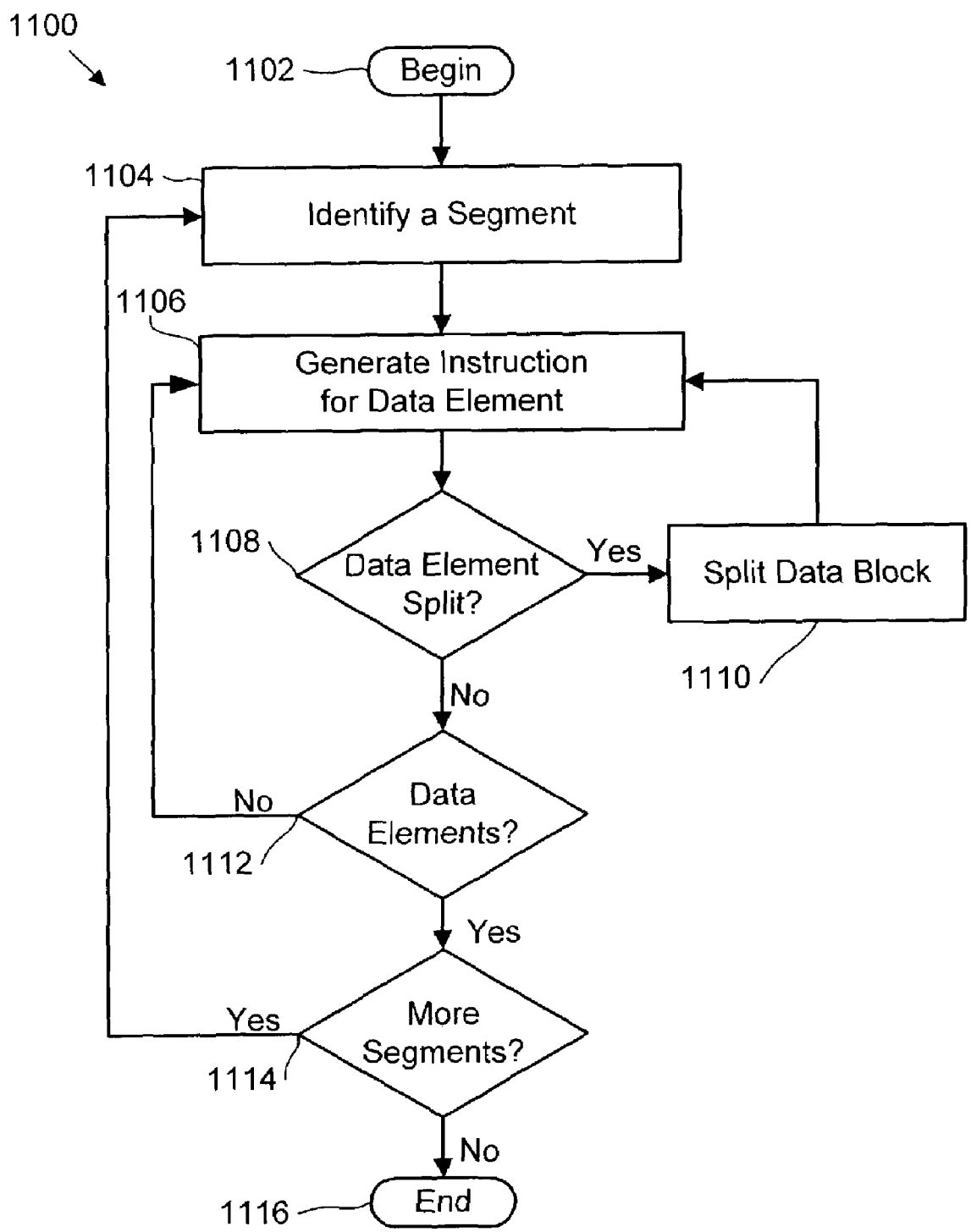
FIG. 11 is a flow chart illustrating a method for generating autonomous data transfer instructions according to one embodiment of the present invention.

FIG. 11 illustrates a method 1100 for handling data block splits across a block boundary of the destination storage device. The method 1100 begins 1102 preferably when autonomous data transfer instructions are generated 1008 (See FIG. 10). First, a segment 610 is identified 1104. One or more segments may exist for a given autonomous data transfer. An autonomous data transfer instruction is generated 1106 to transfer a first data block 504 including any metadata.

Next, a determination 1108 is made regarding whether the data block 504 should be split. If the data block extends beyond the block boundary of the destination storage device, the data block 504 is split 1110. Preferably, splitting the data block 504 comprises producing a suitable data transfer instruction to transfer a first fragment 516 to a first destination block 508 and a second fragment 518 to a second destination block 508. The method 1100 then continues by generating a data transfer instruction for a subsequent data block 504.

If the data block 504 is not split, a determination 1112 is made whether there are more data blocks 504 to process. If so, the method 1100 returns to iteratively generate an instruction for the next data block 504. If there are no more data blocks 504 for the current segment 610, a determination 1114 is made whether there are additional segments 610 for the particular data transfer. If so, the method identifies 11004 the next segment 610. If not, the method 1100 ends 1116.

Figure 12:
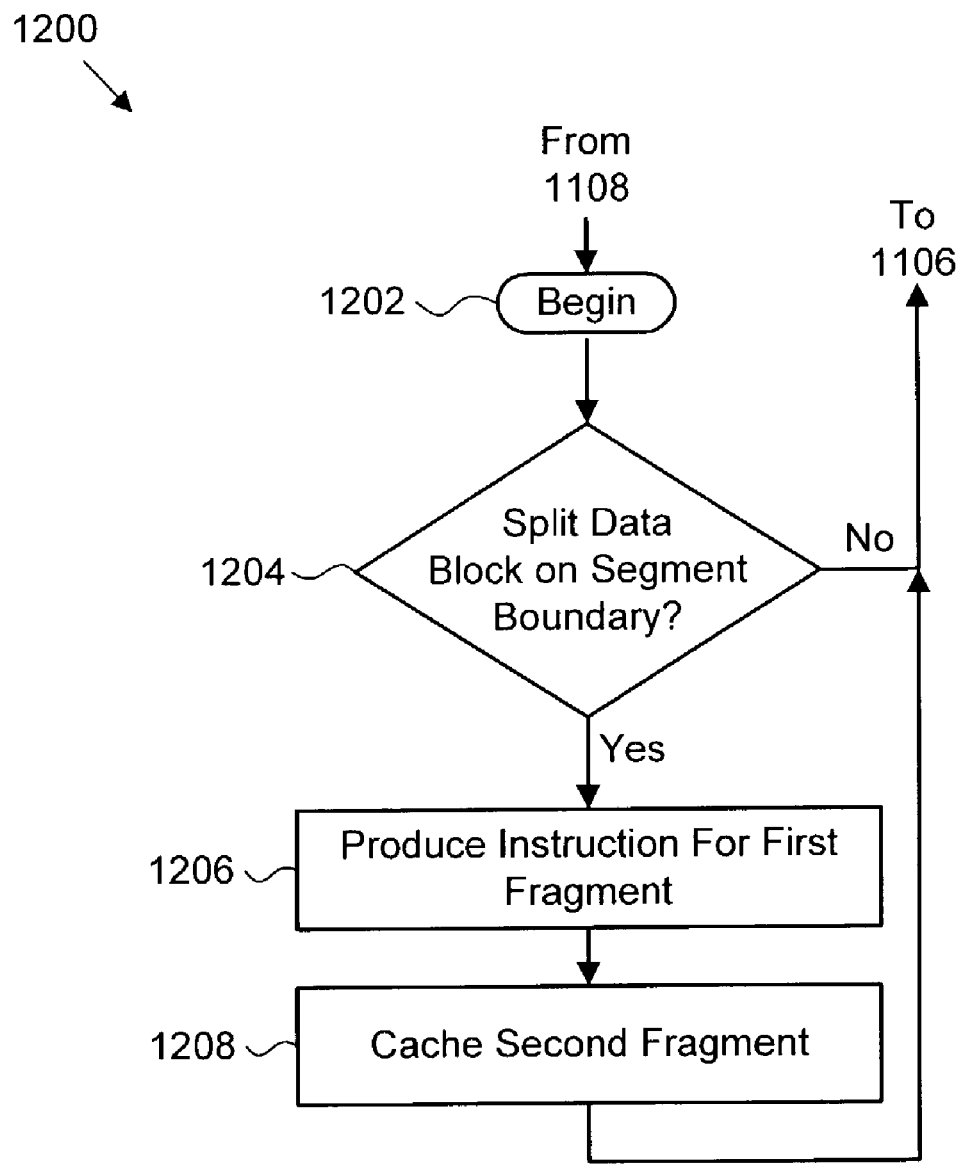
FIG. 12 is a flow chart illustrating a method for executing an autonomous data transfer according to one embodiment of the present invention.

FIG. 12 illustrates a method 1200 for managing a split source data block 504 that extends beyond a block boundary of the destination storage device and corresponds to a segment boundary 612. The method 1200 begins 1202 when a determination is made to split 1110 (See FIG. 11) a data block 504. First, a determination 1204 is made whether the data block 504 is being split on a block boundary 514 that is also a segment boundary 612. If not, the method 1200 returns to the splitting step 1110 of method 1100. If so, a data transfer instruction is produced 1206 to transfer a first fragment 516 to a first destination block 508.

Next, an instruction is generated to cache 1208 a second fragment 518. When the autonomous data transfer is executed, in preferred embodiments, the server 102 checks to determine whether a second fragment 518 is cached prior to initiating an autonomous data transfer for a subsequent segment 610. If a second fragment is cached, the server 102 transfers the cached second fragment 518 to a second destination block 508 and then initiates the autonomous data transfer for the subsequent segment 610.

Figure 13:
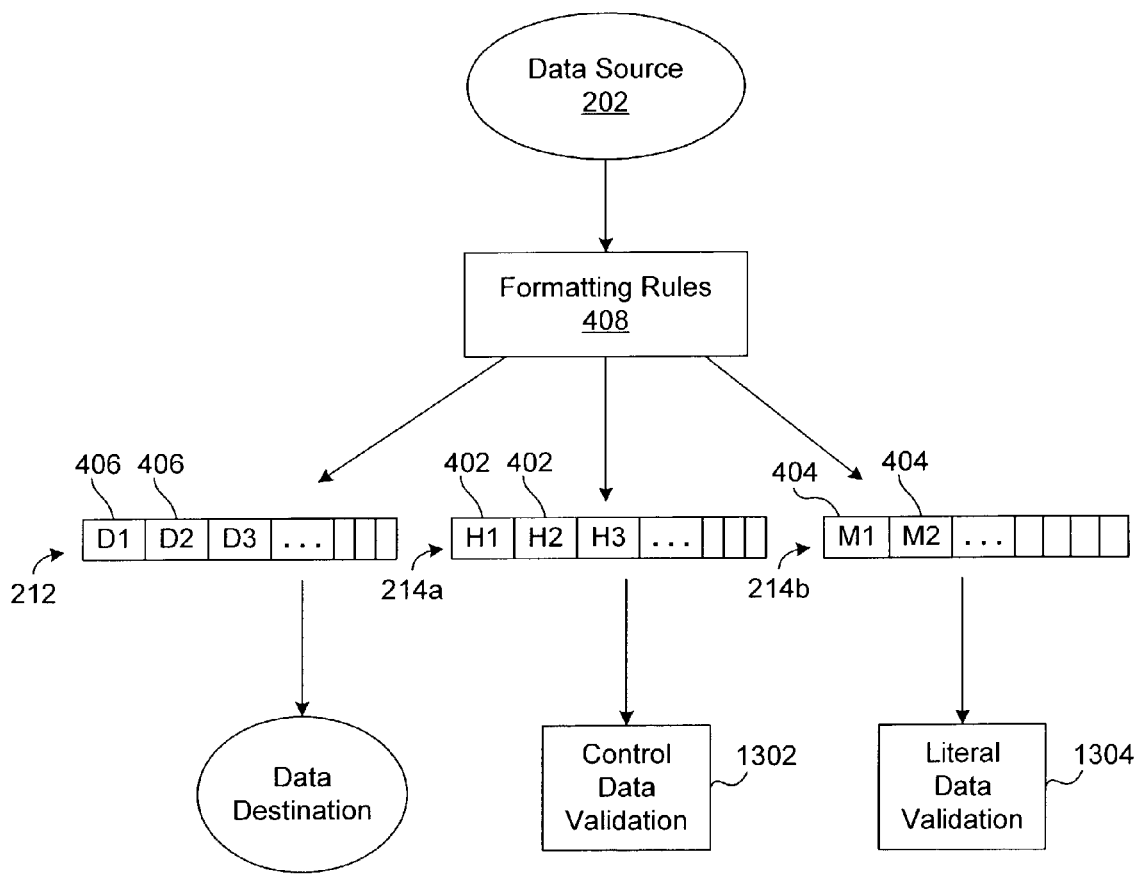
FIG. 13 is a block diagram illustrating deformatting of data and metadata according to one embodiment of the present invention.

FIG. 13 illustrates a block diagram of one manner in which the system, method, and apparatus of the present invention may be used to restore data and validate metadata inserted within the data stream under the present invention. FIG. 13 illustrates the process described in relation to FIG. 4 in reverse. For example, the data source 202 may comprise a tape drive 110 and the data destination may comprise a disk drive 108.

In addition, the present invention allows for the same formatting rules 408 to divide the combined, formatted data as were used to format the data for the data source 202 originally. The present invention may apply the same formatting rules 408 used previously because the data was stored in such an ordered manner. The formatting rules 408 allow the data to be divided and stored in a first location 212 and one or more second locations 214a, 214b.

Next, a disassembler (not shown), which operates similar to an assembler 218, may move data blocks 406 from the first location 212 to the data destination. A control data validation module 1302 may evaluate header blocks 402. A literal data validation module 1304 may evaluate marker blocks 404. If the control data validation module 1302 or the literal data validation module 1304 identifies a data integrity problem a notification may be provided such that users of the data know how accurately the data has been restored. FIG. 13 illustrates that the present invention allows the transfer of data between a source and a destination and back again without any special conditions or accommodations due to the direction in which the data is being transferred between the source and the destination.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for managing autonomous third party data transfers between a source storage device and a destination storage device, comprising:
   a determination module configured to determine a segment size for an autonomous data transfer, the segment size based on a data capacity of a data mover conducting the autonomous data transfer, and selected such that each segment ends on a block boundary of the destination storage device;
   a segmenter configured to divide the autonomous data transfer into segments according to the segment size; and
   an execution module configured to execute an autonomous data transfer for each segment.

2. The apparatus of claim 1, further comprising:
   a data block splitter configured to split a source data block into a first fragment and a second fragment in response to the source data block extending beyond the block boundary of the destination storage device between a first destination block and a second destination block; and
   a transfer module configured to produce data transfer instructions to transfer the first fragment to the first destination block and the second fragment to the second destination block.

3. The apparatus of claim 2, further comprising, a cache module configured to cache the second fragment when the block boundary of the destination storage device corresponds to a segment boundary.

4. The apparatus of claim 3, wherein the execution module is configured to transfer a cached second fragment to the second destination block prior to executing an autonomous data transfer for a subsequent segment.

5. The apparatus of claim 1, further comprising:
   a segment splitter configured to divide a segment into a first segment and a second segment in response to an end of first storage media signal from the destination storage device, and to transfer the second segment to a second storage media.

6. The apparatus of claim 1, further comprising a recorder configured to store information associated with one or more segments transferred to the destination storage device.

7. An apparatus for managing autonomous third party data transfers between a source storage device and a destination storage device, comprising:
   a third party device configured to execute an autonomous data transfer of a segment of a data object according to a set of autonomous operation instructions in which the segment size of the segment is based on a data capacity of the third party device and is selected such that each segment ends on a block boundary of the destination storage device; and
   at least one storage device in communication with the third party device, the at least one storage device configured to respond to autonomous operation instructions issued by the third party device.

8. The apparatus of claim 7, wherein the set of autonomous operation instructions comprises autonomous operation instructions for splitting a source data block into a first fragment and a second fragment in response to the source data block extending beyond the block boundary of the destination storage device between a first destination block and a second destination block, and for transferring the first fragment to the first destination block and the second fragment to the second destination block.

9. The apparatus of claim 8, further comprising a processor configured to cache the second fragment when the block boundary of the destination storage device corresponds to a segment boundary.

10. The apparatus of claim 9, wherein the processor is further configured to transfer a cached second fragment to the second destination block prior to executing an autonomous data transfer for a subsequent segment.

11. A system for managing autonomous third party data transfers between a source storage device and a destination storage device, comprising:
    a data mover configured to communicate with a source storage device and a destination storage device over a network;
    a processor in communication with the data mover and configured to initiate a third party extended copy command to the data mover to transfer data segments comprising source data blocks and embedded metadata data blocks of different sizes between the source storage device and the destination storage device, the processor configured to determine a segment size for data segments based on data capacity of the data mover such that each segment ends on a block boundary of the destination storage device, and to divide a data object into segments according to the segment size.

12. The system of claim 11, wherein the processor is configured to produce third party extended copy commands to split a source data block into a first fragment and a second fragment in response to the source data block extending beyond the block boundary of the destination storage device between a first destination block and a second destination block, and to transfer the first fragment to the first destination block and the second fragment to the second destination block.

13. The system of claim 12, wherein the processor is configured to cache the second fragment when the block boundary of the destination storage device corresponds to a segment boundary.

14. The system of claim 13, wherein the processor is configured to transfer the cached second fragment to the second destination block prior to executing a third party extended copy command for a subsequent segment.

15. The system of claim 11, wherein the source storage device comprises random access media and the destination storage device comprises removable sequential access media.

16. A method for managing autonomous third party data transfers between a source storage device and a destination storage device, comprising:
    determining a segment size for an autonomous data transfer, the segment size based on a data capacity of a data mover conducting the autonomous data transfer, and selected such that each segment ends on a block boundary of the destination storage device;
    dividing the autonomous data transfer into segments according to the segment size; and
    executing an autonomous data transfer for each segment.

17. The method of claim 16, further comprising:
splitting a source data block into a first fragment and a second fragment in response to the source data block extending beyond the block boundary of the destination storage device between a first destination block and a second destination block; and
producing data transfer instructions to transfer the first fragment to the first destination block and the second fragment to the second destination block.

18. The method of claim 17, further comprising caching the second fragment when the block boundary of the destination storage device corresponds to a segment boundary.

19. The method of claim 18, further comprising transferring the cached second fragment to the second destination block prior to executing an autonomous data transfer for a subsequent segment.

20. The method of claim 16, further comprising:
dividing a segment currently being transferred to the destination storage device into a first segment and a second segment in response to an end of first storage media signal from the destination storage device; and
transferring the second segment to a second storage media.

21. The method of claim 16, further comprising storing information associated with one or more segments transferred to the destination storage device.

22. An apparatus for managing autonomous third party data transfers between a source storage device and a destination storage device, comprising:
means for determining a segment size for an autonomous data transfer that includes source data blocks and embedded metadata data blocks of different sizes, the segment size based on a data capacity of a data mover conducting the autonomous data transfer, and selected such that each segment ends on a block boundary of the destination storage device;
means for dividing the autonomous data transfer into segments according to the segment size; and
means for executing an autonomous data transfer for each segment.

23. The apparatus of claim 22, further comprising:
means for splitting a source data block into a first fragment and a second fragment in response to the source data block extending beyond the block boundary of the destination storage device between a first destination block and a second destination block; and
means for producing data transfer instructions to transfer the first fragment to the first destination block and the second fragment to the second destination block.

24. The apparatus of claim 23, further comprising means for caching the second fragment when the block boundary of the destination storage device corresponds to a segment boundary.

25. The apparatus of claim 22, further comprising:
means for dividing a segment currently being transferred to the destination storage device into a first segment and a second segment in response to an end of first storage media signal from the destination storage device; and
means for transferring the second segment to a second storage media.

26. An article of manufacture comprising a program storage medium readable by a processor and embodying one or more instructions executable by a processor to perform a method for managing autonomous third party data transfers between a source storage device and a destination storage device, the method comprising:
determining a segment size for an autonomous data transfer, the segment size based on a data capacity of a data mover conducting the autonomous data transfer, and selected such that each segment ends on a block boundary of the destination storage device;
dividing the autonomous data transfer into segments according to the segment size; and
executing an autonomous data transfer for each segment.

27. The article of manufacture of claim 26, the method further comprising:
splitting a source data block into a first fragment and a second fragment in response to the source data block extending beyond the block boundary of the destination storage device between a first destination block and a second destination block; and
producing data transfer instructions to transfer the first fragment to the first destination block and the second fragment to the second destination block.

28. The article of manufacture of claim 27, the method further comprising caching the second fragment when the block boundary of the destination storage device corresponds to a segment boundary.

29. The article of manufacture of claim 26, the method further comprising:
dividing a segment currently being transferred to the destination storage device into a first segment and a second segment in response to an end of first storage media signal from the destination storage device; and
transferring the second segment to a second storage media.

30. The article of manufacture of claim 26, the method further comprising storing information associated with one or more segments transferred to the destination storage device.

* * * * *